United States Patent [19] [11] 4,009,858
Borsuk et al. [45] Mar. 1, 1977

[54] LOAF MOLD MAGAZINE ASSEMBLY

[75] Inventors: Alvin Borsuk; Hans H. Heydn; Charles H. Johnson, all of Madison, Wis.

[73] Assignee: Oscar Mayer & Co. Inc., Madison, Wis.

[22] Filed: Mar. 11, 1975

[21] Appl. No.: 557,302

[52] U.S. Cl. .................. 249/120; 17/32; 99/441; 249/82; 249/121; 249/126
[51] Int. Cl.² ............................ A22C 7/00
[58] Field of Search .................. 425/62, 453; 249/119–121, 126, 139, 82; 99/353, 441; 17/32; 164/323

[56] References Cited
UNITED STATES PATENTS

| 1,925,157 | 9/1933 | Vogt | 17/32 |
|---|---|---|---|
| 1,945,669 | 2/1934 | Vogt | 17/32 |
| 2,011,989 | 8/1935 | Vogt | 17/32 |
| 3,796,144 | 3/1974 | Foldenaurer | 99/441 |
| 3,813,731 | 6/1974 | Becker et al. | 99/441 |
| 3,892,516 | 7/1975 | McGrew et al. | 249/120 |

Primary Examiner—Francis S. Husar
Assistant Examiner—John McQuade
Attorney, Agent, or Firm—Lockwood, Dewey, Zickert & Alex

[57] ABSTRACT

An assembly of loaf molds defining a magazine, including a pair of vertically extending and horizontally spaced forks and a plurality of horizontally extending and vertically spaced molds secured near opposite ends to the forks. Wheels are mounted on the forks to coact with support rails along which the magazine may be driven. Driving pins are also mounted on the forks to coact with a suitable driving mechanism.

1 Claim, 3 Drawing Figures

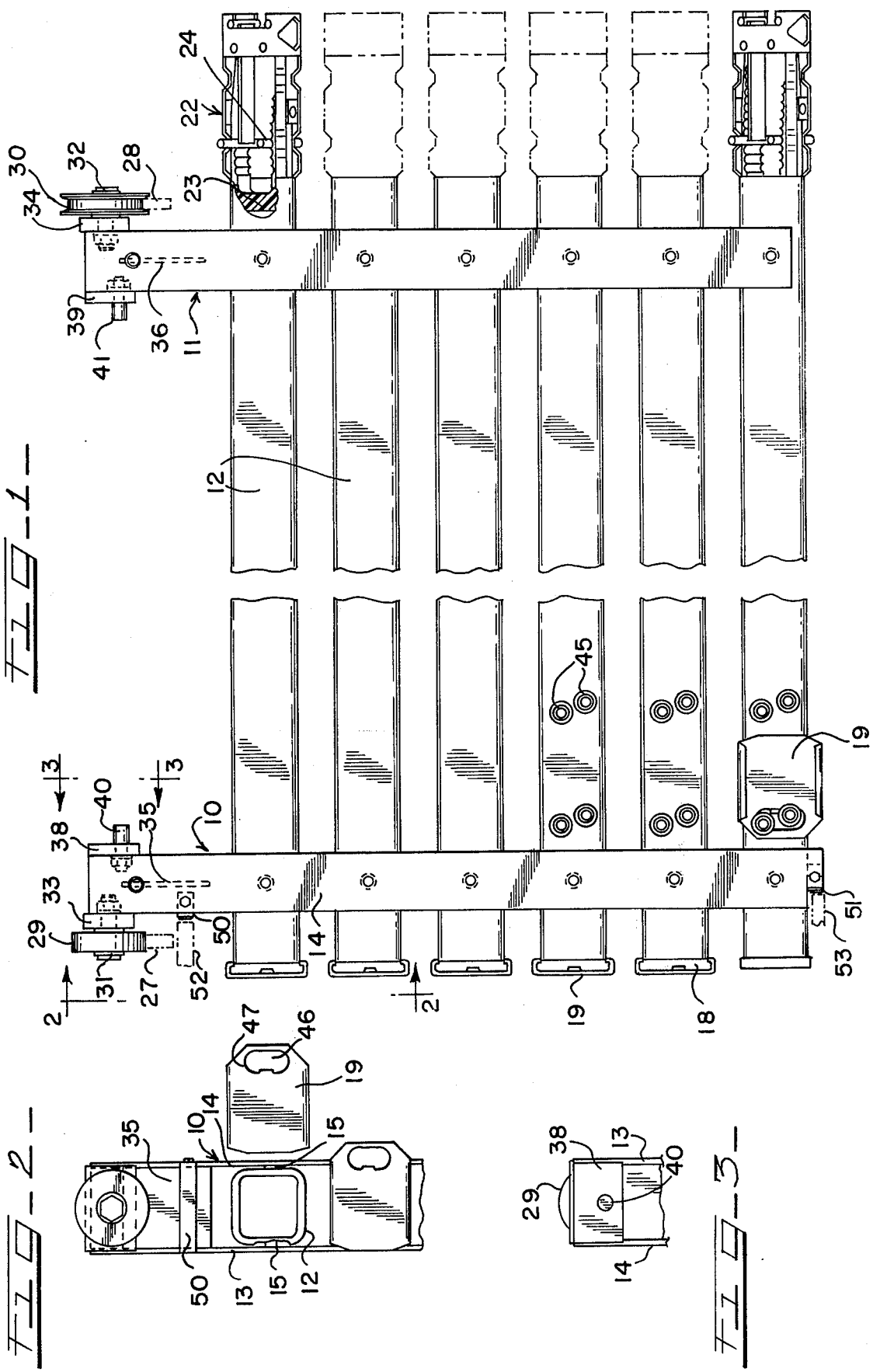

LOAF MOLD MAGAZINE ASSEMBLY

This invention relates in general to the making of a molded food product, and more particularly a magazine assembly including a plurality of loaf molds utilized in a continuous loaf mold process for making a loaf food product.

The magazine assembly of the invention is adapted for use in a continuous loaf processing system for making a loaf food product from a stuffable food material and particularly a loaf meat product. The magazine assembly includes generally stringers or forks interconnected to a plurality of vertically arranged and horizontally extending tubular molds. Rollers or wheels are mounted on the vertical frame members for coacting with horizontally extending support rails or tracks along which the magazine may be driven incrementally through a plurality of work stations. Suitable indexing drive mechanism drives the magazines through the work stations. It will be appreciated that a plurality of the magazines would be employed in a system where a loaf meat product is continually formed and processed. The molds serve as a form for a stuffable meat material which is then moved in the molds by the magazines through cooking and chilling operations. The meat in the molds is squeezed during the chilling operation to obtain a uniformly dimensional product. Thereafter, the meat product is removed from the molds for further processing and handling. The molds are then washed, and a release agent is applied prior to the next stuffing operation.

Each mold is tubular in form with a uniform cross section throughout its length that may be of any suitable cross-sectional shape. The molds are made of stainless steel, and inasmuch as the meat material during cooking will expand, one end of the mold is provided with a closure member that is capable of accommodating the expansion and thereafter also capable of being operated to squeeze the meat material during shrinkage caused by cooling. The other end of the mold is provided with a removable cover member.

It is therefore an object of the present invention to provide a magazine assembly including a pair of forks and a plurality of molds connected to the forks where the molds are grouped horizontally one above the other and the assembly is compact as far as floor space is concerned to provide a maximum capacity and yield.

Another object of the present invention is in the provision of an assembly of loaf molds for processing a meat material to obtain a loaf meat product more efficiently and of a more uniform cross section.

Another object of the present invention is in the provision of an assembly of loaf molds which reduces overall labor costs in the making of a loaf meat product and is simple in function to provide an increased reliability in obtaining a uniform loaf meat product at higher volume.

Another object of the present invention is the provision of an assembly of loaf molds which eliminates the heavy manual labor and related damage to loaf molds which contribute to non-uniform loaves, which is common to conventional methods of making a loaf meat product.

Other objects, features and advantages of the invention will be apparent from the following detailed disclosure, taken in conjunction with the accompanying sheet of drawings, wherein like reference numerals refer to like parts, in which:

FIG. 1 is a front elevational view of the magazine assembly of the present invention showing some parts broken away for purposes of clarity and other parts in phantom to show the relationship of the magazine relative to supporting rails;

FIG. 2 is a partial end elevational view taken substantially along the lines 2—2 of FIG. 1; and FIG. 3 is a partial elevational view taken substantially along line 3—3 of FIG. 1 and showing the driving pin.

The magazine assembly of the present invention includes a plurality of horizontally grouped loaf molds one above the other, which reduces overall floor space while providing a plurality of molds that may be handled for processing a plurality of loaves of meat at the same time. Particularly, the assembly includes generally a plurality of tubular in shape molds secured together with a pair of stringers or forks having rollers or wheels for supporting the overall assembly on and along horizontal rails.

Referring particularly to the drawings, the assembly includes a pair of vertically arranged and horizontally spaced forks or stringers 10 and 11, which are suitably secured to a plurality of horizontally extending and vertically spaced tubular loaf molds 12. While there are six molds shown in this embodiment, it can be appreciated that any number may be provided within the range of the space that is available in a vertical plane. The molds are horizontally grouped and placed one above the other in equally spaced apart relationship, and in vertical alignment, as seen in FIG. 2. Each fork or stringer includes a pair of horizontally spaced and vertically extending side plates or bars. As seen by the fork 10, it includes side plates or bars 13 and 14, between which the molds 12 are arranged and suitably secured. At each of the stringers, pads or spacers 15 are secured, such as by welding, to the opposite sides of the molds and are suitably secured to the side plates 13 and 14. While the molds 12 are here shown to be square in cross section, it will be appreciated they may be rectangular or of any suitable shape, but preferably uniformly of the same cross section throughout their length. By virtue of the interconnection between the molds and the forks, where the forks 10 and 11 are connected together by the molds, it can be seen that the molds provide part of the overall framework for the magazine assembly.

One end of each mold is provided with a peripheral flange 18 that is slightly decreased in thickness at the upper and lower sides for purposes of receiving a slip-on cover 19 enclosing the end of the mold through which meat material is stuffed and the final meat product is removed. Accordingly, the cover flange 18 facilitates the retention of a slip-on cover 19 after the mold has been stuffed with a suitable meat material and during cooking and chilling thereof.

The end of the mold opposite where the removable cover fits includes a take-up mechanism 22 for permitting expansion of the food product within the mold during cooking to prevent distortion of the mold and also for allowing contraction or squeezing of the food product when it shrinks or contracts during chilling of same. With respect to the present invention, any suitable type of mechanism may be used for accomplishing the expansion and contraction functions. The specific mechanism illustrated includes a plastic plug 23 movable within the mold and associated with spring pawls 24 for obtaining a controlled expansion and contraction. This particular form of mechanism forms no part of the present invention but is the subject matter of a separate application also assigned to the assignee of this application. Accordingly, no more specific details of this mechanism will be discussed.

In order to support the magazine assembly on horizontally extending rails or tracks 27 and 28, rollers or wheels 29 and 30 are mounted at the upper ends of the forks 10 and 11. The roller or wheel 29 is flat across the width, while the roller or wheel 30 is grooved or flanged. The rail 28 is sized so that it will fit within the groove of the roller 30, wherein the roller provides guiding action to the magazine assembly. Each of the rollers is mounted on the outside upper end of the forks 10 and 11 by means of shafts 31 and 32 suitably secured to wheel cross bars or plates 33 and 34, which are in turn secured such as by welding across the spaced plates 13 and 14. To provide additional strength between plates 13 and 14 at the upper ends, reinforcing panels 35 and 36 are suitably welded in place. The reinforcing plates extend transversely to the side plates 13 and 14.

At the inner facing sides of the forks 10 and 11, pin or dog supported plates 38 and 39 are secured such as by welding across the side plates 13 and 14 and to which are suitably attached driving pins or dogs 40 and 41. The pins or dogs 40 and 41 coact with suitable driving mechanism for incrementally advancing the magazines along the rails 27 and 28. The suitable driving mechanism may be in the form of movable and locking bars forming a "walking beam" conveyer. However, this conveyer forms no part of the present invention but is the subject matter of a separate application also assigned to the assignee of this application. Any suitable drive mechanism may be provided for engaging and disengaging the pins or dogs 40 and 41 for driving the magazines incrementally along the support rails.

Prior to removal of the meat loaves from the molds, the removable covers 19 are removed from the flanged ends of the molds and hung on headed pins 45 mounted on the leading sides of the lower three molds. Each of the covers 19 includes a slotted opening 46 in a handle portion 47 which is sized to allow the heads of the pins 45 to be received while the covers are tilted with respect to the molds. Thereafter, the cover is rotated clockwise until the pins are engaged by the slot edges, wherein the pins cantileverly support the cover in a horizontal position. The undersides of the covers are facing outwardly, as shown in FIG. 1, so that they can be washed when the molds are being washed, and later have a release agent applied thereto.

During squeezing of the product in the chilling station, the plastic plugs 23 are urged toward the end where the removable covers are mounted, and accordingly, substantial force is applied to the overall magazine along the horizontal. In order to counteract this force and prevent movement of the magazine and possible dislodgment from the supporting rails 27 and 28, stop bars 50 and 51 are mounted on the fork 10. The bars 50 are suitably secured between the side plates 13 and 14 of the fork 10 and coact with stationary stops 52 and 53 that are suitably mounted at the stations where lateral forces are applied to the magazine. Such stops are also provided at the station where the product is removed from the molds, which involves driving the plugs 23 from their position at the take-up end of the molds shown in FIG. 1 through the mold toward the flanged end of the mold.

It will be understood that modifications and variations may be effected without departing from the scope of the novel concepts of the present invention, but it is understood that this application is to be limited only by the scope of the appended claims.

The invention is hereby claimed as follows:

1. A magazine assembly for processing a stuffable food material to produce a loaf food product comprising: a pair of horizontally spaced vertically extending forks, a plurality of vertically spaced horizontally extending tubular molds secured adjacent their opposite ends to the forks, said molds having a uniform cross section, means closing the opposite ends of the molds to hold the food material during processing, rollers mounted at the upper ends of the forks for coacting with support rails on which the magazine is adapted to be moved along a path extending at right angles to the molds, pin means on said forks adapted to be engaged for moving and positioning the magazine assembly along the rails, and bars on the outside of one fork for coaction with stops to prevent movement of the magazine in response to application of forces to the molds in the direction of the stops.

* * * * *